Oct. 6, 1925.
E. D. TILLYER
1,556,550
LENS TESTING INSTRUMENT
Filed May 31, 1921
2 Sheets-Sheet 1
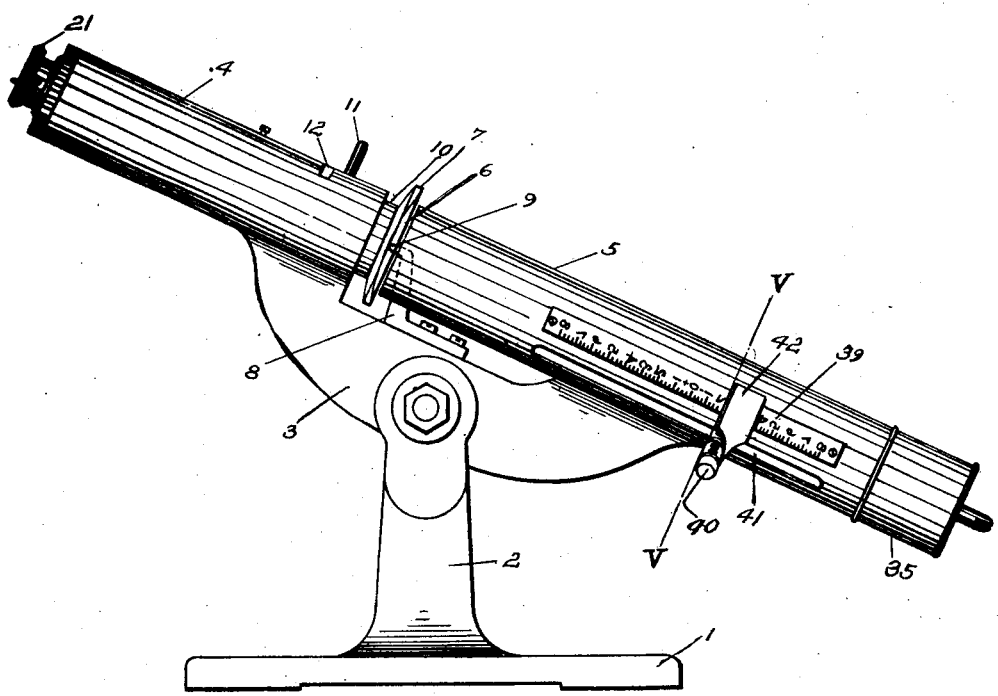
FIG.I
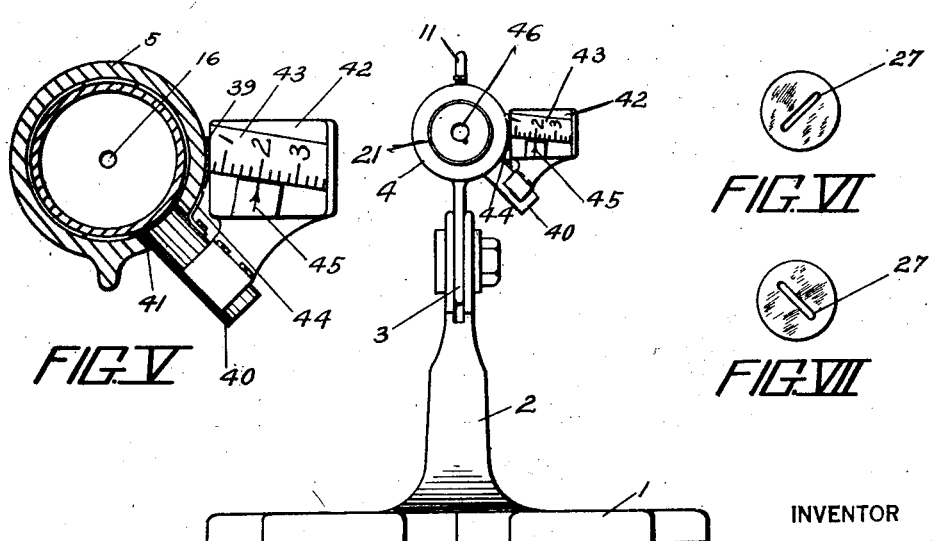
FIG.V
FIG.IV
FIG.VI
FIG.VII
INVENTOR
EDGAR D. TILLYER
BY
H. H. Styll H. H. Parsons
ATTORNEY

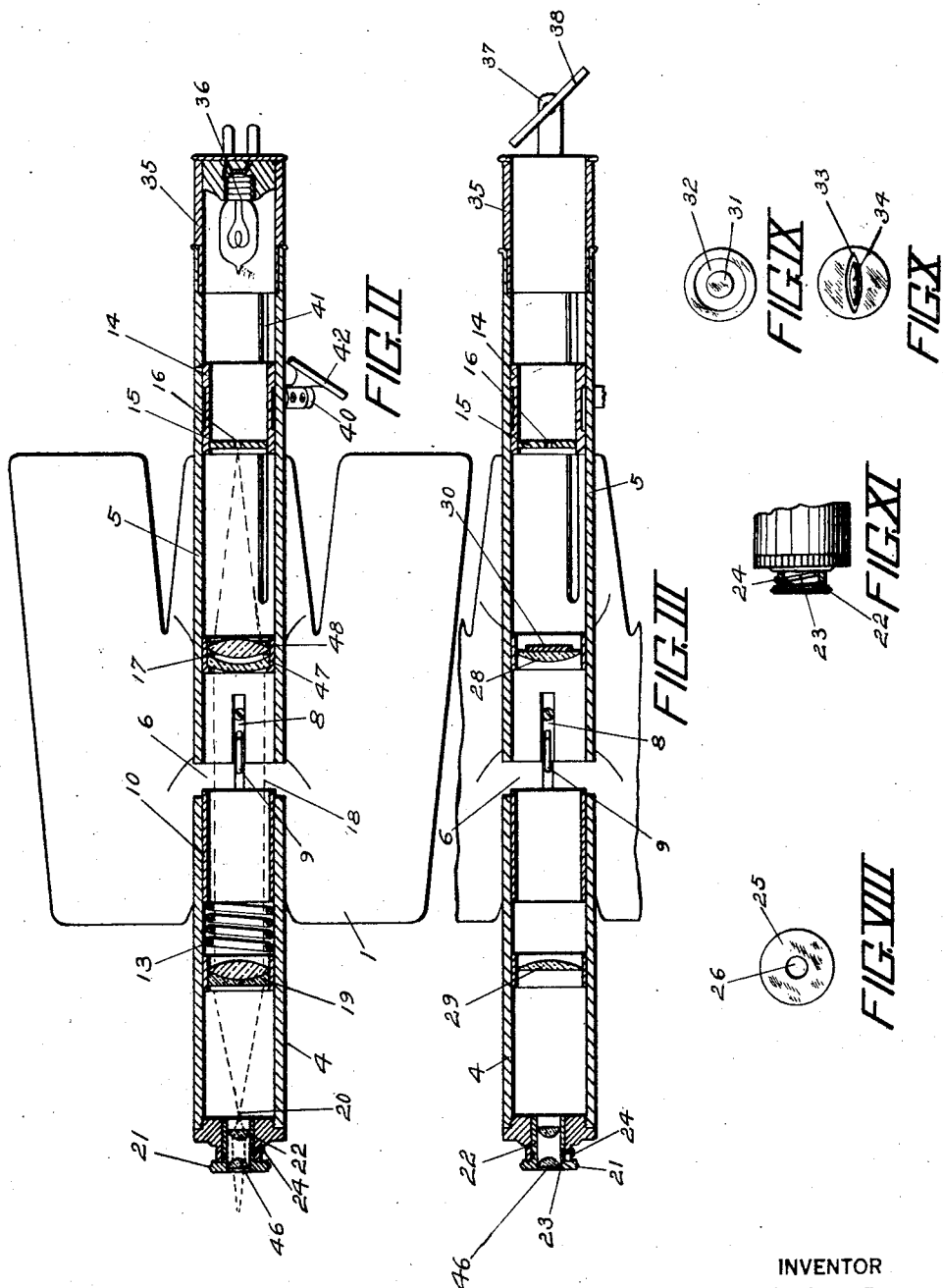

Patented Oct. 6, 1925.

1,556,550

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

Application filed May 31, 1921. Serial No. 473,843.

*To all whom it may concern:*

Be it known that I, EDGAR D. TILLYER, a citizen of the United States, residing at Southbridge, in the county of Worcester and State of Massachusetts, have invented certain new and useful Improvements in Lens-Testing Instruments, of which the following is a specification.

This invention relates to improvements in lens testing instruments and has particular reference to an improved construction of instrument for use in determining the focal value of either spherical or spherocylindrical lenses of any form.

One of the leading objects of the present invention is the provision of a simple, efficient and inexpensive instrument of the character above set forth which shall be of extreme accuracy in the measurement of lenses and which will properly indicate their vertex or back focus value irrespective of their shape.

A further object of the present invention is the provision of an improved simplified construction of instrument in which both the testing of the eye and the reading of the result attained may be accomplished by the operator without appreciably shifting his position before the instrument.

A further object of the invention is the provision of an improved type of instrument in which ordinary lenses may be employed for its construction as distinguished from specially ground or compound lenses, and in which an equally accurate and correct reading may be secured.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation of an instrument embodying my improvements.

Figure II represents a longitudinal horizontal sectional view thereof.

Figure III represents a view similar to Figure II illustrating slight modifications in the details of construction of the instrument.

Figure IV represents an end view of the instrument.

Figure V represents an enlarged sectional view as on the line V—V of Figure I.

Figure VI represents a reproduction of the target as seen when a cylindrical lens is being tested as to one meridian.

Figure VII shows the image of the target with the lens held in the same direction when the lens is focused for the opposite meridian or cylinder axis.

Figure VIII represents a view of the image as seen when a spherical lens is properly focused in the instrument.

Figure IX represents a view of the image seen with the instrument in Figure III when slightly out of focus with a spherical lens.

Figure X represents a similar view in connection with the testing of a cylindrical lens.

Figure XI represents a detail view of the eye piece construction.

In the drawings, the numeral 1 designates the base of the instrument having rising therefrom the standard 2 to which is pivoted the bracket 3 supporting the enclosing tubes or body portions 4 and 5 of my instrument which are spaced apart as at 6 to receive the lens 7 to be tested. A lens engaging bracket 8 is secured to the member 3 and has its point 9 positioned to bear against the back face of the lens to be tested to insure exact correct positioning of this surface of the lens with respect to the remainder of the instrument so that the reading given will be in back focus or vertex refraction measurements. While the lens may be held against this point as by hand, I preferably employ a suitable mechanical holding means such as the sliding tube 10 operable as by the handle 11 projecting outward through the casing and movable in the bayonet slot 12 to lock it in disengaging position. This tube may have either a friction fit within the body portion 4 to frictionally hold the lens, or an actuating spring 13 may be employed to force the holder against the lens when disengaged from the outward locking portion of the bayonet slot 12.

My improved instrument is designed to be of the most simple possible form to accurately produce the intended result, and comprises essentially as shown in Figures II and III, a slide 14 bearing a target or object disc 15 provided with a circular aperture transparent portion or the like, 16, forming a target in combination with a lens system including the lens 17 designed when the object is at zero position to render the emergent rays from point 16 parallel, as indicated by the dotted lines 18 in Figure II, a second lens 19 adapted to receive the parallel rays and focus them to intersect or form an aerial image as at 20. A suitable adjustable eye piece member 21 is carried by the tube 4 substantially in position to properly reproduce the aerial image for the eye of the observer. This eye piece includes a sleeve portion 22 having a spiral groove 23 engaged by the pin or screw 24 carried by the member 4 so that rotation of the eye piece will on account of the pin and groove engagement, move the same in and out to focus for the individual requirements of the particular user of the instrument.

By reference to Figure II the operation of this instrument should be readily understood, and it will be seen that under ordinary conditions suitable illumination being supplied to the aperture or object 16 the rays of light will diverge as far as the lens 17 and will then be rendered parallel to the lens 19, when they will be converged to form the image reproduced at the eye piece. When a lens is introduced into the system as at 6 it is then merely necessary to shift the slide 14 to compensate for the effect of the lens introduced, while on account of the arrangement of the optical system an even scale may be employed to measure the amount of shifting and thus to indicate the power of the lens introduced. The effect of the instrument being in focus is shown in the reproduction of the image Figure VIII, the image seen being a dark or really opaque portion 25 with a circle of light 26 in the center, the circle being clear when the instrument is in exact focus, blurring at a few hundredths variation, and disappearing entirely when the instrument is appreciably out of correct focal position. In the case of a cylinder lens the effect is slightly different in that as the target is shifted to the correct focus for one axis of the lens a slot 27 of light will appear, while when the instrument is further shifted for the axis at right angles the slot 27 will again appear but in a direction at right angles, this being due to the cylindrical elongation or changing of shape of the circle or object aperture 16.

In Figure III, I have shown a slight modification of the lens system in which ordinary or simple lenses 28 and 29 are employed in place of the compound lenses 17 and 19 of Figure II, the construction of the instrument being otherwise the same. It is appreciated that it would not be possible to use these lenses satisfactorily under ordinary conditions, but I have discovered that by blanking off the central portion of the lens 28, as by the opaque shield 30, so that the lens is projected only through the marginal portion, a lens of this type will satisfactorily function instead of it being necessary to make use of a specially ground and corrected or compound lens. This construction also has an advantage in focalization which may be employed with equally satisfactory results in connection with a lens such as 17. This effect is best understood by reference to Figures IX and X, and by this structure enabling the operator to best gage the focalization of the lens or departure of the lens from correct power. In this form of invention in place of the image being merely blurred when not in exact correct focus, the image of a spherical lens will appear as in Figure IX, that is, with a black spot 31 in the center surrounded by a ring of light 32, this ring becoming smaller and finally focusing to the image 26 of Figure VIII when the parts are in correct position. Also in the case of the cylinder lens in place of a blurred elongated slot when the instrument is near but somewhat out of focus there will appear the further elliptical configuration 33 having the dark center 34, the bows of the sides approaching together as the instrument is focused until they finally reach the single illuminated slot of Figures VI and VII. This effect is produced due to the fact that separate bundles of rays are coming around the sides of the mask 30 and are not coming to an exact focal point having the same spread effect as the blurring of the image of Figure I but with center eliminated. Thus we see that the central circular diaphragm on one lens of the system, such as the standard lens, is so constructed that the lens allows only a narrow circular band or annular band of light to pass therearound.

I have referred to illumination of the object for clearness of vision and I preferably so construct my instrument that it may be interchangeably employed with either artificial or natural illumination. This I accomplish by fitting into the outer end of the tube the sleeve or carrier 35 which may bear either the bulb 36 or may have an arm or bracket portion 37 to which is pivoted a mirror 38 which may be tilted to direct either natural or artificial illumination from outside longitudinally, up the tube through the aperture or object 16, producing the necessary illumination for operation of the instrument.

A particular advantage possessed by the present instrument over anything hitherto known is that it is possible for the operator to both examine the lens being tested and determine the power of reading without materially shifting his position before the instrument. This is due to the fact that the scale 39 on the side of the instrument in place of being of ordinary form is a reversed scale, while the slide 14 is provided with an operating handle portion 40 extending outwardly through the slot 41 in the tube 5, the handle being further provided with a mirror 42.

This mirror is disposed at an angle to the direction of movement of the handle so as to reproduce the portion of the scale adjacent the handle in reversed or readable form, as indicated at 43. The handle is further provided with a dial or indicator 44 having a pointer whose image 45 will appear on the mirror alined with the designation for the proper power adjustment of the slide, as will be clearly understood by reference to Figures IV and V. These advantages will be best understood by reference to Figure IV, which is a view looking at the eye piece end of the instrument, from which it will be understood that the eye may either look in at the eye piece aperture 46 or by slight shifting look at the images 43-45 indicating the adjustment of the slide which has been made to render the image clear to the eye at 46, a slight movement of the head permitting this reading without otherwise shifting the body and with the line of vision substantially the same as that used in the testing operation.

I would further call attention to the fact that the lens designated as an entirety by the numeral 17 is a compound lens built up of two parts, one being rigidly held in the cell or holder 47 and the other being carried by a separate ring 48 screwed into the interior of the holder 47 and capable of adjustment with respect to the rigid lens for correction of any inaccuracies in the mounting of the other parts of the instrument or exact construction of the lenses themselves so that the reading of the instrument will be exactly correct.

I claim:

1. In an instrument of the character described, the combination with a support, of a target member slidably mounted upon the support, a sighting tube axially alined with the target member and having a lens rest portion and an eye piece section slidably supported adjacent the lens rest a tube arranged within the tube and actuable to clamp the lens to be tested against the lens rest.

2. In an instrument of the character described, the combination with a support, of a target member slidably mounted upon the support, a sighting tube axially alined with the target member and having a lens rest portion and an eye piece section therein, a second tube in the tube and slidably supported adjacent the lens rest and actuatable to clamp the lens to be tested against the lens rest, the support having a tubular portion in which the lens clamping member slides, one of said two last mentioned parts being provided with a projecting pin and the other with a bayonet slot to receive the pin, whereby the sliding member is guided by the engagement of the pin in the slot and may be locked in retracted position by partial rotation causing the pin to move in the right angle portion of the slot.

3. A lens testing instrument including a slidable apertured disc, spaced lenses for rendering emergent rays from the aperture parallel, a lens holder intermediate the lenses, said lens holder comprising a member having a point for engaging one surface of the lens, an annulus for engaging the opposite face of the lens, and means for moving the annulus in engagement with the lens to retain it against the point.

4. A lens testing instrument including a slidable apertured disc, spaced lenses for rendering emergent rays from the aperture parallel, a lens holder intermediate the lenses, said lens holder comprising a member having a point for engaging one surface of the lens, an annulus for engaging the opposite face of the lens, and means for moving the annulus in engagement with the lens to retain it against the point, said means including a spring for forcing the annulus into operative position.

5. A lens testing instrument including a slidable apertured disc, spaced lenses for rendering emergent rays from the aperture parallel, a lens holder intermediate the lenses, said lens holder comprising a member having a point for engaging one surface of the lens, an annulus for engaging the opposite face of the lens, means for moving the annulus in engagement with the lens to retain it against the point, said means including a spring for forcing the annulus into operative position, and means for securing the annulus in retracted position against the pressure of the spring.

6. A lens testing instrument including a sighting tube, an adjustable member within the tube, a cooperating scale and pointer on the exterior of the tube for indicating the adjustment of said member, and means for projecting the reading of the scale in a direction parallel with the sighting tube.

7. In a device of the character described, the combination with a sighting tube, of a slide contained in the tube having a laterally projecting handle, a pointer carried by said handle, a reversed scale on the tube cooperating with the pointer and a reflecting member carried by the handle and viewable from the ocular end of the sighting tube to project thereto an image of the pointer and cooperating portion of the instrument scale, substantially as and for the purpose described.

8. A device of the character described including a sighting tube, an object and means in the tube for producing an aerial image of the object, said means including a plurality of lenses, one of said lenses having the center thereof blanked off substantially as and for the purpose described.

9. A lens testing instrument, including a standard, a furcated head carried by the standard, aligned independent tube portions carried by the furcations, one of said tube portions including a lens rest and the other having a tube slidable therein to clampingly secure the lens to be tested against the lens rest.

10. A lens testing instrument, including a standard, a furcated head carried by the standard, aligned independent tube portions carried by the furcations, one of said tube portions including a lens rest and the other having a tube slidable therein to clampingly secure the lens to be tested against the lens rest, and a movable illuminated target axially shiftable with respect to said parts, substantially as and for the purpose described.

11. A lens testing instrument, including a standard, a furcated head carried by the standard, aligned independent tube portions carried by the furcations, one of said tube portions including a lens rest and the other having a tube slidable therein to clampingly secure the lens to be tested against the lens rest, a movable illuminated target axially shiftable with respect to said parts, a stationary lens member in the lens rest bearing tube for projecting the image of the target, and a second lens member in the slidable tube bearing tube for bringing to a focus the projected rays from the target member.

12. In a device of the character described, the combination with a tubular support, of a combined sighting tube and lens clamp slidably engaged therein, and having a tube for clampingly engaging the lens to be tested, said member being further provided with an interiorly disposed lens and an actuating spring bearing against the exterior end of the tube for forcing the tube into lens clamping position.

13. A lens testing instrument, including a base and a furcated head rising from the base, a tubular member carried by each of the furcations, said tubular members being in axial alinement, one of said members having a lens rest and the other of said members bearing an interior sliding tube forming a lens clamp, a lens in one of the furcated members, and a second lens in the other of said members and an adjustable illuminated target supported by one of the furcations of the head in axial alinement with the several tubular members and having a projecting actuating portion for relatively shifting the same, and means for indicating the amount of adjustment required.

14. In an instrument of the character described, a stand having a bifurcated head, a tube on one of the bifurcations having a telescopic lens system focused to receive parallel light, and a telescoping tubular clamp slidingly mounted in the tube, a second tube on the other bifurcation aligned with the first tube, having a lens positioning stop for the lens to be tested, a standard lens system, a target slidable therein, illuminating means to illuminate the target, and a scale to indicate the position of the target.

15. In an instrument of the character described, a stand having a bifurcated head, a tube on one of the bifurcations having a telescoping lens system focused to receive parallel light and a telescoping tubular clamp slidingly mounted in the tube, a second tube on the other bifurcation aligned with the first tube, having a positioning stop for the lens to be tested, a standard lens system, the central portion only of which is blanked off to transmit an annular beam of light, a target slidable therein, illuminating means to illuminate the target, and a scale to indicate the position of the target.

In testimony whereof I have affixed my signature.

EDGAR D. TILLYER.